H. A. BECKER.
SHOCK ABSORBING WHEEL.
APPLICATION FILED JUNE 29, 1912.

1,091,622.

Patented Mar. 31, 1914.

2 SHEETS—SHEET 1.

Witnesses
J. D. Bremer
H. C. Van Ryn

Inventor
Hugo A. Becker
By Erwin E. Wheeler
Attorneys

H. A. BECKER.
SHOCK ABSORBING WHEEL.
APPLICATION FILED JUNE 29, 1912.
1,091,622.
Patented Mar. 31, 1914.
2 SHEETS—SHEET 2.
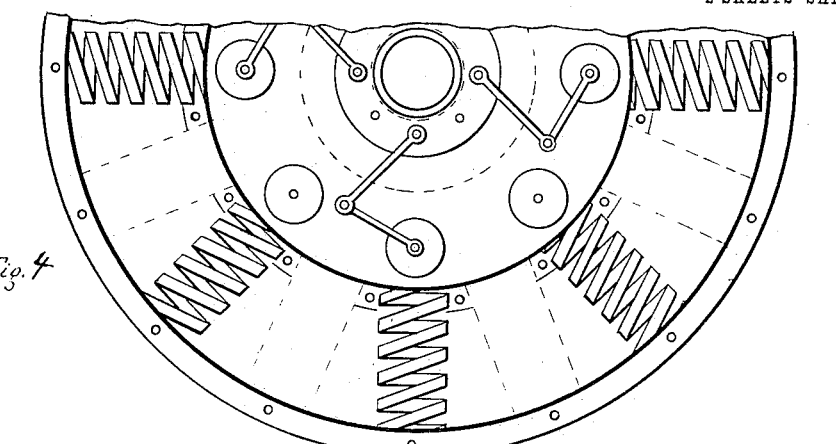
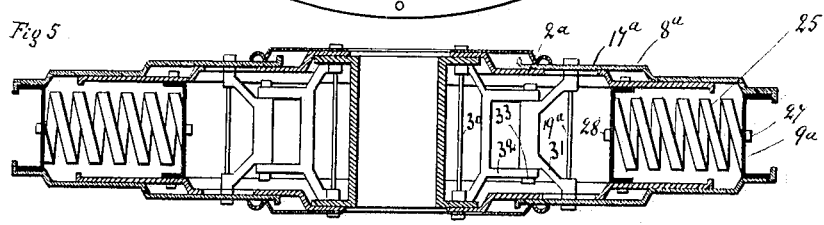
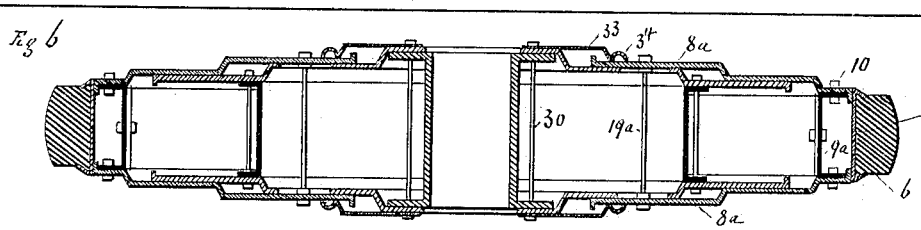
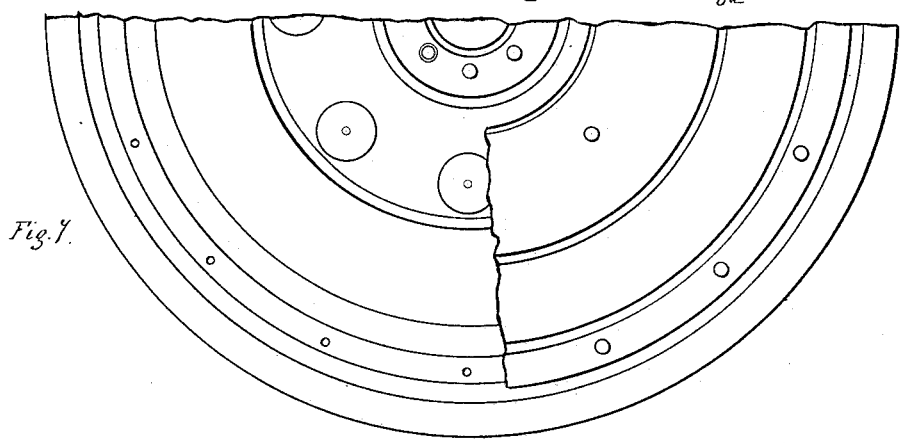

UNITED STATES PATENT OFFICE.

HUGO A. BECKER, OF MILWAUKEE, WISCONSIN.

SHOCK-ABSORBING WHEEL.

1,091,622.  Specification of Letters Patent. Patented Mar. 31, 1914.

Application filed June 29, 1912. Serial No. 706,545.

*To all whom it may concern:*

Be it known that I, HUGO A. BECKER, a subject of King George of Great Britain, residing at Milwaukee, county of Milwaukee, and State of Wisconsin, have invented new and useful Improvements in Shock-Absorbing Wheels, of which the following is a specification.

My invention relates to improvements in shock absorbing wheels.

The object of my invention is to provide a form of construction in which the tire or outer rim of the wheel may be mounted upon springs and yieldingly supported in such a manner that the shocks resulting from the contact of the wheels with obstructions will not be communicated separately to the individual springs, but will be distributed to all the springs in a set, some of the springs being compressed under direct pressure, while others will be at tension and still others subject in part to tension and in part to compression.

A further object of my invention is to provide a structure having sufficient strength and durability for practical use, in which the hub of the wheel will be substantially floated on the springs and vibrations absorbed without materially affecting the vehicle axle, all regardless of the character of the tire used.

Figure 1:
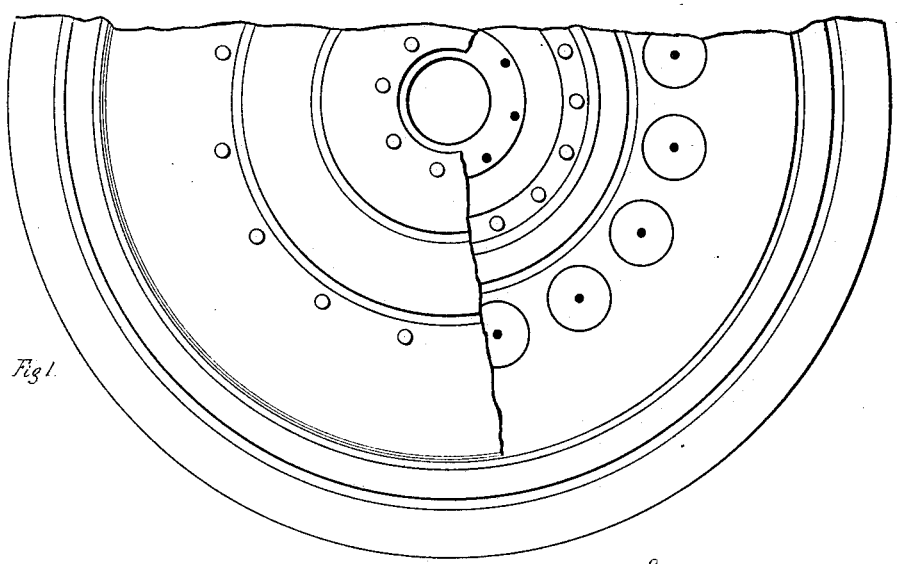
Figure 2:
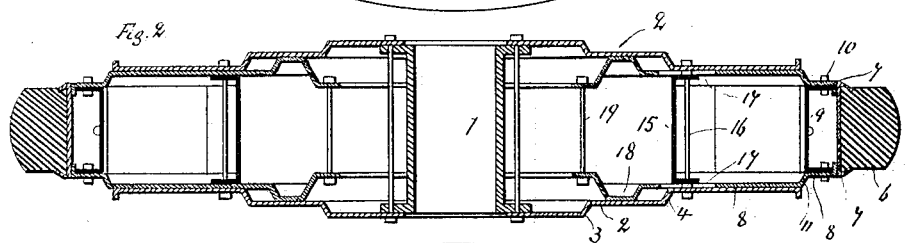
Figure 3:
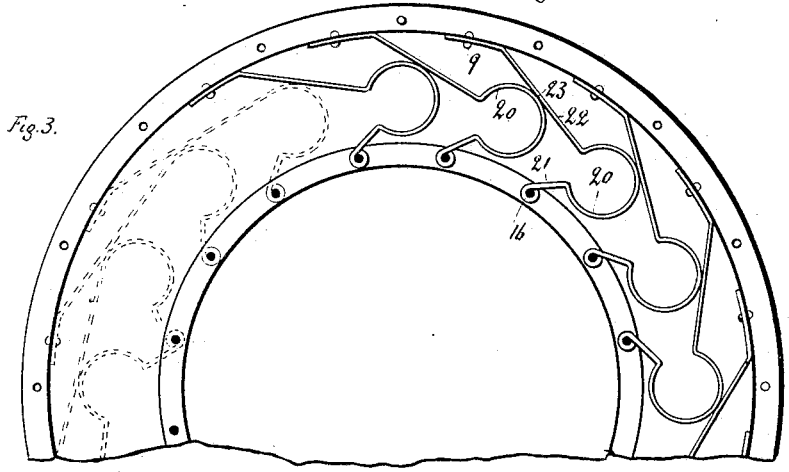

In the drawings—Figure 1 is a side view of a portion of a wheel embodying my invention with the hub plate partially broken away. Fig. 2 is a central sectional view of a wheel embodying my invention. Fig. 3 is a detail fragmentary view of a wheel embodying my invention with side plates and tire removed to expose the inner and outer rims and connecting springs, the hub being also omitted. Fig. 4 is a similar view showing the hub and also showing a modified form of construction, embodying the use of coiled springs in place of those shown in Fig. 3. Fig. 5 is a central sectional view of the same. Fig. 6 is a similar view with the springs omitted and the tire in place, and showing also a dust guard to exclude dust from the interior cavities of the wheel. Fig. 7 is a fragmentary side view of the construction shown in Fig. 6.

Like parts are identified by the same reference characters throughout the several views.

In Figs. 1, 2 and 3 a hub 1 is provided with annular hub disks or plates 2, which may be inwardly offset at 3 and 4, the inward offsets serving to strengthen the structure and also to facilitate supporting the rim disks as hereinafter explained. The tire 6 is mounted upon the inturned flanges 7 of a set of rim disks 8, the outer margins of which are connected by an outer rim 9 secured to the disks by bolts 10. These rim disks 8 are preferably outwardly offset at 11 and fitted between the outer portions of the disks 2. An inner rim 15 is connected with the hub disks 2 by cross rods 16 which extend through apertures 17 in the rim disks 8. Near their inner margins the rim disks 8 are provided with an annular offset 18, which is adapted to bear upon the hub disks between the offsets 3 and 4 therein. Spacing cross rods 19 connect the inner marginal portions of the rim disks. These inner margins are at some distance from the hub 1, whereby the disks 8 may be moved inwardly and outwardly between the disks 2, such movement being limited by the diameter of the apertures 17.

Cushioning devices are employed between the outer rim 9 and the inner rim 15. These cushioning devices may comprise the segmental spring members 20, having inner arms 21 connected with the cross rods 16, and outer arms 22 connected with the outer rim 9. The arm 22 of each spring is preferably arranged to bear at 23 upon the circularly curved portion 20 of an adjacent spring in the series, whereby the compressing movement of any one spring will be transmitted directly to the next. These springs are preferably made of a width substantially equal to the width of the rim member 9 where springs of the character shown in Figs. 2 and 3 are employed, but in Figs. 4 and 5 I have illustrated coiled springs 25. Where these are used, there is a tendency for the springs under tractive strain, to bend annularly under the gripping tendency of the outer rim 9. The springs 25 are connected with the rims 9 and 15 at 27 and 28 respectively, but these connections are not sufficient to sustain the springs when thus subjected to tractive strains. In this construction, therefore, I connect the cross rods 19$^a$ with hub cross rods 30 by means of toggle members 31 and 32, linked to the respective rods and connected with each other by a pintle 33. In this construction also the holes 17$^a$ are formed in the hub disks 2$^a$, and the rim disks 8ᵃ on each side of the wheel bear upon the exterior surface of the hub disks 2ᵃ instead of upon the interior surface, as illustrated in Fig. 2. The rods 19ᵃ extend through the holes 17ᵃ in the hub disks 2ᵃ, and are connected directly and rigidly with the outer or rim disks 8ᵃ.

A dust excluding guard comprising an annular plate 33', preferably covers the inner margin of the disks 8ᵃ, as shown in Fig. 6. These guards may conveniently be secured to the cross rods 30 and provided with non-metallic packing or bearing rings 34 which bear upon the outer surfaces of the rim disks 8ᵃ.

From the foregoing description it is obvious that it is not essential to my invention whether the members which support the outer rim and tire are slidably mounted within the members connected with the hub or exterior thereto. It will also be understood that while I have shown and described these members as comprising disks, it is not essential to my invention that continuity be preserved, the disk wheels and spoke wheels being well known equivalents for each other. I prefer to use disks, however, for the reason that dust and moisture may be more effectually excluded from the interior of the wheel and from the springs. It will also be observed that the specific type of resilient cushion employed between the inner and outer rims is not regarded as essential. In the construction illustrated in Figs. 1, 2 and 3, the peculiar form of the springs and the fact that they bear upon each other, as shown at 23, enables me to utilize the springs themselves to counteract tractive strains, particularly if the springs are connected to the inner rim in a radial line advanced a substantial distance from a radial line cutting the point of connection with the outer rim.

I claim—

1. The combination with a wheel hub, of a set of disks rigidly connected therewith, another set of disks lapping in side contact with the first mentioned disks, an outer rim connected with one of the sets of disks, an inner rim, a set of bolts connecting the same with the other set of disks, cushioning devices between said rims, and a tire supported from the outer rim; said second set of disks lapping upon the first mentioned set beyond the connecting bolts of the inner rim, and one of said sets of disks being slotted to permit the outer rim and outer set of disks to move along radial lines in opposition to the pressure of the cushioning devices.

2. The combination with a wheel hub of a set of radially slotted disks rigidly connected therewith and provided at intervals with inwardly extending annular offsets progressively narrowing the space between said disks from the hub outwardly, a set of rim disks mounted to slide in side contact with the first set of disks and provided with off-sets corresponding with and concentric to the off-sets of the hub disks, past which the rim disks extend and arranged with sufficient space between the offsets on the respective disks to permit radial movement of the rim disks, inner and outer rims, one secured to the hub disks and the other secured to the rim disks, a tire mounted on the outer rim, cushioning devices supporting the outer rim from the inner rim, and cross rods connecting the disks of one set with each other, the disks of the other set being provided with radial slots through which said cross rods pass.

3. The combination with a wheel hub, of a set of disks rigidly connected therewith, another set of disks lapping in side contact with the first mentioned disks, an outer rim connected with one of the sets of disks, an inner rim, a set of bolts connecting the same with the other set of disks, cushioning devices between said disks, and a tire supported from the outer rim; said second set of disks lapping upon the first mentioned set beyond the connecting bolts of the inner rim, and one of said sets of disks being slotted to permit the outer rim and outer set of disks to move along radial lines in opposition to the pressure of the cushioning devices, said cushioning devices comprising a series of flat springs reversely bent and provided with a segmental central portion, said springs each having one extremity connected with the inner rim and the other extremity connected with the outer rim, substantially as described.

4. The combination with a wheel hub, of a set of hub disks rigidly connected therewith, a set of rim disks mounted to slide in side contact with the hub disks, cross rods connecting the outer disks with each other, the inner disks being provided with radial slots through which said cross rods pass, an inner rim connected with the disks of one set, an outer rim connected with the disks of the other set and adapted to receive a tire, and cushioning devices interposed between the rims, said cushioning devices being housed in by the disks and rims.

In testimony whereof I affix my signature in the presence of two witnesses.

HUGO A. BECKER.

Witnesses:
LEVERETT C. WHEELER,
IRMA D. BREMER.

Copies of this patent may be obtained for five cents each, by addressing the "Commissioner of Patents, Washington, D. C."